United States Patent
Bell et al.

(10) Patent No.: US 12,446,574 B2
(45) Date of Patent: Oct. 21, 2025

(54) ADJUVANTS FOR AGROCHEMICAL FORMULATIONS

(71) Applicant: SYNGENTA CROP PROTECTION AG, Basel (CH)

(72) Inventors: Gordon Alastair Bell, Bracknell (GB); Flavio Castagnini, Münchwilen (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 0 days.

(21) Appl. No.: 16/469,128

(22) PCT Filed: Dec. 11, 2017

(86) PCT No.: PCT/EP2017/082260
§ 371 (c)(1),
(2) Date: Jun. 12, 2019

(87) PCT Pub. No.: WO2018/108830
PCT Pub. Date: Jun. 21, 2018

(65) Prior Publication Data
US 2020/0022365 A1    Jan. 23, 2020

(30) Foreign Application Priority Data
Dec. 15, 2016 (GB) ..................... 1621375

(51) Int. Cl.
*A01N 25/04*    (2006.01)
*A01N 25/30*    (2006.01)
*A01N 31/02*    (2006.01)
*A01N 43/08*    (2006.01)
*A01N 43/16*    (2006.01)
*A01N 43/50*    (2006.01)

(52) U.S. Cl.
CPC ............. *A01N 25/04* (2013.01); *A01N 25/30* (2013.01); *A01N 43/50* (2013.01); *A01N 31/02* (2013.01); *A01N 43/08* (2013.01); *A01N 43/16* (2013.01)

(58) Field of Classification Search
None
See application file for complete search history.

(56) References Cited

U.S. PATENT DOCUMENTS

| | | | | |
|---|---|---|---|---|
| 7,135,437 | B2 * | 11/2006 | Pallas | A01N 25/02 504/206 |
| 7,135,438 | B1 | 11/2006 | Batlogg et al. | |
| 2015/0080273 | A1 * | 3/2015 | Hatchman | B01D 19/0404 507/219 |
| 2015/0237861 | A1 * | 8/2015 | Gobbi | A01N 25/00 514/341 |
| 2016/0244562 | A1 * | 8/2016 | Lindner | A01N 25/30 |

FOREIGN PATENT DOCUMENTS

| | | | | |
|---|---|---|---|---|
| EP | 0943241 | A1 * | 9/1999 | ............. A01N 43/90 |
| EP | 2545774 | A1 * | 1/2013 | ............. A01N 25/02 |
| JP | 2015511594 | A | 4/2015 | |
| WO | 2010003889 | A1 | 1/2010 | |
| WO | 2013135604 | A1 | 9/2013 | |

OTHER PUBLICATIONS

Plurafac LF types, Mar. 2013, BASF The Chemical Company, p. 1-9 (Year: 2013).*
Reza Najjar, Microemulsions—A brief introduction, 2012, InTech, (Year: 2012).*
International Search Report for International Patent Application No. PCT/EP2017/082260 mailed Feb. 13, 2018.

* cited by examiner

*Primary Examiner* — Sue X Liu
*Assistant Examiner* — Ali S Saeed
(74) *Attorney, Agent, or Firm* — BakerHostetler; Toni-Junell Herbert

(57) ABSTRACT

The present invention relates to an aqueous formulation comprising an agrochemical at a concentration of up to 45% w/w; a non-ionic surfactant with a cloud point of from 35° C. to 55° C. at a concentration of up to 60% w/w; an ethoxylated or propoxylated sorbitan ester at a concentration from 1% to 40% w/w; an alkyl polyglucoside, propylene glycol, glycerol or a glycol ether or two or more of these compounds, at a concentration from 1% to 40% w/w; and water at a concentration of at least 1% w/w. The formulation provides low and high temperature stability.

7 Claims, No Drawings

ADJUVANTS FOR AGROCHEMICAL FORMULATIONS

CROSS-REFERENCE TO RELATED APPLICATIONS

This application is a 371 National Stage application of International Application No. PCT/EP2017/082260, filed Dec. 11, 2017, which claims priority European Patent Application No. 1621375.3, filed Dec. 15, 2016 the entire contents of which application are hereby incorporated by reference.

The present invention relates to an aqueous formulation comprising an agrochemical at a concentration of up to 45% w/w; a non-ionic surfactant with a cloud point of from 35° C. to 55° C. at a concentration of up to 60% w/w; an ethoxylated or propoxylated sorbitan ester at a concentration from 1% to 40% w/w; an alkyl polyglucoside, propylene glycol, glycerol, a glycol ether or two or more of these compounds, at a concentration from 1% to 40% w/w; and water at a concentration of at least 1% w/w. The formulation provides low and high temperature stability.

It is common practice to add adjuvant materials to agrochemical formulations in order to enhance the biological efficacy of the agrochemical active ingredient. In the case of an aqueous formulation this can lead to problems with compatibility between the adjuvant and water. Commercial formulations usually need to have physical stability across a wide temperature range, often from −10° C. to 50° C. The adjuvant has to remain stable in the aqueous formulation at the concentration of use between these extremes. Many adjuvant materials are surfactants which display temperature and concentration dependent behaviour in water. This is often called liquid crystal behaviour. The invention discloses formulations which can compatibilise surfactants in water across a wide range of temperatures and concentrations. In addition to this the formulation prevents problems which arise when salts or other ingredients are also added to the formulation.

Adjuvants are added to agrochemical formulations to enhance the biological performance of the product. There are many types of adjuvant however those according to the present invention are nonionic surfactants. Nonionic surfactants contain a head and tail structure where the head is conventionally referred to as hydrophilic. Typically the head will be ethoxylated but it may also contain one or more moieties selected from propoxylate and butoxylate groups. The structure of the adjuvant can therefore be complicated as the combination of a hydrophobic tail with the elements of the hydrophilic head leads to many possible structures.

The adjuvants (non-ionic surfactants) of the present invention are defined by their cloud point as measured using BS EN1890:2006, method E, in which 5 g of surfactant is added to 25 g of an aqueous butyldiglycol solution. The butyldiglycol solution is prepared at 250 g/l in water. The surfactant solution is then heated until the single phase solution becomes cloudy or forms two phases. The point at which the solution is no longer homogeneous is the cloud point. This method is also published by the British Standards Institution under ISBN 0 580 48935 3.

For the purposes of the present invention we define a stable formulation of adjuvant in water as one where the mixture forms a homogeneous or single phase liquid. The liquid may be a micellar solution however it will appear isotropic to the naked eye. These liquids do not separate into multiple layers on standing at any temperature from −10° C. to 50° C. For the purposes of the examples given to prove this invention we have defined standing as equilibration over 24 hours at the temperature of interest; however it is to be recognized that the samples are stable at these temperatures for much longer periods. This stability allows the design of products with shelf lives potentially running to several years.

The adjuvant containing formulations of the present invention are also free flowing and easy to pour out of their container. A problem which can occur with these formulations is that they become viscous sometimes at high temperatures and sometimes on cooling. We have defined the ability to pour or generally use these formulations according to their viscosity. We define viscosity according to the units of milliPascal seconds (mPas). Viscosity is most easily measured using a Brookfield LVT viscometer using method BS EN 12092:2001 (published by BSI under ISBN 0 580 39284 8). All values quoted in this document were measured at 23° C.

Accordingly, the present invention provides a formulation which comprises
(i) an agrochemical at a concentration of up to 45% w/w;
(ii) a non-ionic surfactant with a cloud point of from 35° C. to 55° C. and which is not component (iii) or (iv) at a concentration of up to 60% w/w;
(iii) an ethoxylated or propoxylated sorbitan ester at a concentration from 1% to 40% w/w;
(iv) an alkyl polyglucoside; propylene glycol; glycerol; a glycol ether; or two or more of these compounds, at a concentration from 1% to 40% w/w; and
(v) water at a concentration of at least 1% w/w.

Preferably, the non-ionic surfactant (ii) has a cloud point from 40° C. to 50° C.; more preferably from 42° C. to 47° C.

Suitably the non-ionic surfactant (ii) is one which has a viscosity in water at 23° C., at a concentration from 8 to 90% w/w (preferably 10 to 90% w/w), of less than 5000 mPas; more suitably less than 1000 mPas; and even more suitably less than 500 mPas. Preferably this is a Brookfield viscosity.

Preferably, component (iv) is an alkyl polyglucoside (APG) or propylene glycol; more preferably propylene glycol.

Preferably the concentration of (iv) is from 5 to 30% w/w; more preferably from 8 to 20% w/w; even more preferably from 10 to 20% w/w.

The APGs used in the present invention are compounds of formula (I):

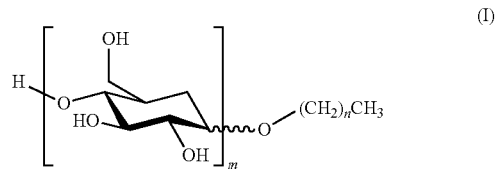

where n is a mean value and is from 7 to 11; and m is a mean value and is from 1 to 3. [n+1 is the mean number of carbon atoms in the hydrophobic tail of the APG; and m is the mean number of sugar rings on the hydrophilic head group of the APG.]

The non-ionic surfactant (ii) may be selected from the following: a 10 carbon atom chain with three moles of ethoxylate as a head group, a mixture of C13 and C15 atom tails with 10 moles of ethoxylate and two moles of butylene oxide on the head group, a mixture of 12 and 13 carbon atom chains along with 5 moles of ethoxylate and 2 moles of propoxylate, a 10 carbon atom chain with three moles of ethoxylate and three moles of propoxylate, a 10 carbon atom chain along with seven moles of ethoxylate and five moles of propoxylate, a 10 carbon atom chain with three moles of ethoxylate and three moles of propoxylate, a mixture of 13 and 15 carbon atom chain along with ten moles of ethoxylate and two moles of butoxylate, a 10 carbon atom chain with three moles of ethoxylate and three moles of propoxylate, a branched 11 carbon atom chain along with four moles of ethoxylate and three moles of propoxylate, a 10 carbon atom chain with three moles of ethoxylate and three moles of propoxylate, a 10 carbon atom chain along with two moles of ethoxylate and three moles of propoxylate, a 10 carbon atom chain with three moles of ethoxylate and three moles of propoxylate, a mixture of 9 and 11 carbon atom chains along with five moles of ethoxylate and two moles of propoxylate with a terminal methyl group, a 10 carbon atom chain with three moles of ethoxylate and three moles of propoxylate, a mixture of 9 and 11 carbon atom chains along with six moles of ethoxylate and a terminal methyl group on the ethoxylate chain, a 10 carbon atom chain along with ten moles of ethoxylate and one mole of pentoxylate, and a mixture of 6 and 8 carbon atom chains along with two moles of ethoxylate and two moles of propoxylate; suitably from a 10 carbon atom chain with three moles of ethoxylate as a head group, a mixture of C13 and C15 atom tails with 10 moles of ethoxylate and two moles of butylene oxide on the head group, a mixture of 12 and 13 carbon atom chains along with 5 moles of ethoxylate and 2 moles of propoxylate, a 10 carbon atom chain with three moles of ethoxylate and three moles of propoxylate, a 10 carbon atom chain along with seven moles of ethoxylate and five moles of propoxylate, a 10 carbon atom chain with three moles of ethoxylate and three moles of propoxylate, a mixture of 13 and 15 carbon atom chain along with ten moles of ethoxylate and two moles of butoxylate, a 10 carbon atom chain with three moles of ethoxylate and three moles of propoxylate, a branched 11 carbon atom chain along with four moles of ethoxylate and three moles of propoxylate, a 10 carbon atom chain with three moles of ethoxylate and three moles of propoxylate, a 10 carbon atom chain along with two moles of ethoxylate and three moles of propoxylate, a 10 carbon atom chain with three moles of ethoxylate and three moles of propoxylate, a mixture of 9 and 11 carbon atom chains along with five moles of ethoxylate and two moles of propoxylate and a terminal methyl group; and a 10 carbon atom chain with three moles of ethoxylate and three moles of propoxylate; and more suitably from a 10 carbon atom chain with three moles of ethoxylate as a head group, a mixture of C13 and C15 atom tails with 10 moles of ethoxylate and two moles of butylene oxide on the head group, a mixture of 12 and 13 carbon atom chains along with 5 moles of ethoxylate and 2 moles of propoxylate, a 10 carbon atom chain with three moles of ethoxylate and three moles of propoxylate; and a 10 carbon atom chain along with seven moles of ethoxylate and five moles of propoxylate. Suitably the carbon atom chains are hydrocarbon chains, more suitably aliphatic chains, branched or unbranched; even more suitably alkyl or alkenyl chains, branched or unbranched.

Therefore suitably the non-ionic surfactant is Plurafac® LF 1430, Plurafac® LF 131, Plurafac® LF 305, Plurafac® LF 900, Plurafac® LF 1530, Plurafac® LF 731, Plurafac® LF 7319, Plurafac® LF 405, Plurafac® LF 220, Plurafac® LF 226, Plurafac® LF 300, Plurafac® LF 400, Plurafac® LF 403, Plurafac® LF 431, Plurafac® LF 901, Plurafac® LF 120, Plurafac® LF 221, Plurafac® LF 404 or Plurafac® LF 711; more preferably it is Plurafac® LF 220, Plurafac® LF 226, Plurafac® LF 300, Plurafac® LF 400, Plurafac® LF 403, Plurafac® LF 431, Plurafac® LF 901, Plurafac® LF 120, Plurafac® LF 221, Plurafac® LF 404 or Plurafac® LF 711; and even more preferably it is Plurafac® LF 120, Plurafac® LF 221, Plurafac® LF 400, Plurafac® LF404 or Plurafac® LF 711; (or any compound of the same chemistry as any one of these materials but provided under an alternative name or Trademark).

Plurafac® LF 221 is a butylene oxide/ethylene oxide copolymer of a C13-C15 alcohol (as defined in WO2009/088778A1, page 16, paragraph [0045]).

Preferably (iii) is a polysorbate-type nonionic surfactant formed by the ethoxylation of sorbitan before the addition of lauric, palmitic, stearic or oleic acid. Suitably the mean degree of ethoxylation is 20. More preferably (iii) is a polysorbate-type nonionic surfactant formed by the ethoxylation of sorbitan before the addition of lauric acid. Suitably the mean degree of ethoxylation is 20.

Preferably the concentration of the ethoxylated or propoxylated sorbitan ester (iii) is from 5 to 30% w/w; more preferably from 10 to 20% w/w.

The noun "agrochemical" and term "agrochemically active ingredient" are used herein interchangeably, and include herbicides, insecticides, nematicides, molluscicides, fungicides, plant growth regulators and safeners; preferably herbicides, insecticides and fungicides; more preferably fungicides and herbicides; and most preferably herbicides.

An agrochemical, or a salt of an agrochemical, selected form those given below, may be suitable for the present invention.

Suitable herbicides include pinoxaden, bicyclopyrone, mesotrione, fomesafen, tralkoxydim, napropamide, amitraz, propanil, pyrimethanil, dicloran, tecnazene, toclofos methyl, flamprop M, 2,4-D, MCPA, mecoprop, clodinafop-propargyl, cyhalo fop-butyl, diclofop methyl, haloxyfop, quizalofop-P, indol-3-ylacetic acid, 1-naphthylacetic acid, isoxaben, tebutam, chlorthal dimethyl, benomyl, benfuresate, dicamba, dichlobenil, benazolin, triazoxide, fluazuron, teflubenzuron, phenmedipham, acetochlor, alachlor, metolachlor, pretilachlor, thenylchlor, alloxydim, butroxydim, clethodim, cyclodim, sethoxydim, tepraloxydim, pendimethalin, dinoterb, bifenox, oxyfluorfen, acifluorfen, fluazifop, S-metolachlor, glyphosate, glufosinate, paraquat, diquat, fluoroglyco fen-ethyl, bromoxynil, ioxynil, imazamethabenz-methyl, imazapyr, imazaquin, imazethapyr, imazapic, imazamox, flumioxazin, flumiclorac-pentyl, picloram, amodosulfuron, chlorsulfuron, nicosulfuron, rimsulfuron, triasulfuron, triallate, pebulate, prosulfocarb, molinate, atrazine, simazine, cyanazine, ametryn, prometryn, terbuthylazine, terbutryn, sulcotrione, isoproturon, linuron, fenuron, chlorotoluron, metoxuron, iodosulfuron, mesosulfuron, diflufenican, flufenacet, fluroxypyr, aminopyralid, pyroxsulam, XDE-848 Rinskor and halauxifen-methyl.

Suitable fungicides include isopyrazam, mandipropamid, azoxystrobin, trifloxystrobin, kresoxim methyl, mefenoxam, famoxadone, metominostrobin and picoxystrobin, cyprodanil, carbendazim, thiabendazole, dimethomorph, vinclozolin, iprodione, dithiocarbamate, imazalil, prochloraz, fluquinconazole, epoxiconazole, flutriafol, azaconazole, bitertanol, bromuconazole, cyproconazole, difenoconazole, hexaconazole, paclobutrazole, propiconazole, tebuconazole, triadimefon, trtiticonazole, fenpropimorph, tridemorph, fenpropidin, mancozeb, metiram, chlorothalonil, thiram, ziram, captafol, captan, folpet, fluazinam, flutolanil, carboxin, metalaxyl, bupirimate, ethirimol, dimoxystrobin, fluoxastrobin, orysastrobin, metominostrobin, prothioconazole, adepidyn, bixafen, fludioxinil, fluxapyroxad, prothioconazole, pyraclostrobin, revysol, solatenol and xemium.

Suitable insecticides include thiamethoxam, imidacloprid, acetamiprid, clothianidin, dinotefuran, nitenpyram, fiprinil, abamectin, emamectin, tefluthrin, emamectin benzoate, bendiocarb, carbaryl, fenoxycarb, isoprocarb, pirimicarb, propoxur, xylylcarb, asulam, chlorpropham, endosulfan, heptachlor, tebufenozide, bensultap, diethofencarb, pirimiphos methyl, aldicarb, methomyl, cyprmethrin, bioallethrin, deltamethrin, lambda cyhalothrin, cyhalothrin, cyfluthrin, fenvalerate, imiprothrin, permethrin, halfenprox, chlorantraniliprole, oxamyl, flupyradifurone, sedaxane, inscalis, rynaxypyr, sulfoxaflor and spinetoram.

Suitable plant growth regulators include paclobutrazole, trinexapac-ethyl and 1-methylcyclopropene.

Suitable safeners include benoxacor, cloquintocet-mexyl, cyometrinil, dichlormid, fenchlorazole-ethyl, fenclorim, flurazole, fluxofenim, mefenpyr-diethyl, MG-191, naphthalic anhydride and oxabetrinil.

Suitably, the agrochemical is selected from bicyclopyrone, mesotrione, pinoxaden, fomesafen, tralkoxydim, napropamide, amitraz, propanil, pyrimethanil, dicloran, tecnazene, toclofos methyl, flamprop M, 2,4-D, MCPA, mecoprop, clodinafop-propargyl, cyhalofop-butyl, diclofop methyl, haloxyfop, quizalofop-P, indol-3-ylacetic acid, 1-naphthylacetic acid, isoxaben, tebutam, chlorthal dimethyl, benomyl, benfuresate, dicamba, dichlobenil, benazolin, triazoxide, fluazuron, teflubenzuron, phenmedipham, acetochlor, alachlor, metolachlor, pretilachlor, thenylchlor, alloxydim, butroxydim, clethodim, cyclodim, sethoxydim, tepraloxydim, pendimethalin, dinoterb, bifenox, oxyfluorfen, acifluorfen, fluoroglyco fen-ethyl, bromoxynil, ioxynil, imazamethabenz-methyl, imazapyr, imazaquin, imazethapyr, imazapic, imazamox, flumioxazin, flumiclorac-pentyl, picloram, amodosulfuron, chlorsulfuron, nicosulfuron, rimsulfuron, triasulfuron, triallate, pebulate, prosulfocarb, molinate, atrazine, simazine, cyanazine, ametryn, prometryn, terbuthylazine, terbutryn, sulcotrione, isoproturon, linuron, fenuron, chlorotoluron, metoxuron, isopyrazam, mandipropamid, azoxystrobin, trifloxystrobin, kresoxim methyl, famoxadone, metominostrobin and picoxystrobin, cyprodanil, carbendazim, thiabendazole, dimethomorph, vinclozolin, iprodione, dithiocarbamate, imazalil, prochloraz, fluquinconazole, epoxiconazole, flutriafol, azaconazole, bitertanol, bromuconazole, cyproconazole, difenoconazole, hexaconazole, paclobutrazole, propiconazole, tebuconazole, triadimefon, trtiticonazole, fenpropimorph, tridemorph, fenpropidin, mancozeb, metiram, chlorothalonil, thiram, ziram, captafol, captan, folpet, fluazinam, flutolanil, carboxin, metalaxyl, bupirimate, ethirimol, dimoxystrobin, fluoxastrobin, orysastrobin, metominostrobin, prothioconazole, thiamethoxam, imidacloprid, acetamiprid, clothianidin, dinotefuran, nitenpyram, fipronil, abamectin, emamectin, bendiocarb, carbaryl, fenoxycarb, isoprocarb, pirimicarb, propoxur, xylylcarb, asulam, chlorpropham, endosulfan, heptachlor, tebufenozide, bensultap, diethofencarb, pirimiphos methyl, aldicarb, methomyl, cyprmethrin, bioallethrin, deltamethrin, lambda cyhalothrin, cyhalothrin, cyfluthrin, fenvalerate, imiprothrin, permethrin, halfenprox, paclobutrazole, 1-methylcyclopropene, benoxacor, cloquintocet-mexyl, cyometrinil, dichlormid, fenchlorazole-ethyl, fenclorim, flurazole, fluxofenim, mefenpyr-diethyl, MG-191, naphthalic anhydride and oxabetrinil.

Preferably, the agrochemical is imazamox.

The various editions of The Pesticide Manual [especially the 14th and 15th editions] also disclose details of agrochemicals, any one of which may suitably be used in the present invention.

Suitably, compositions of the invention may comprise one or more of the agrochemicals described above.

Generally any agrochemically active ingredient will be present at a concentration of from 0.000001% to 45% w/w; preferably from 0.001% to 45% w/w; more preferably from 0.1 to 25% w/w. Suitably the agrochemical (i) is in solution at a concentration from 1 to 20% w/w.

Agrochemical compositions of the invention may be in the form of a ready-to-use formulation or in concentrate form suitable for further dilution by the end user, and the concentration of agrochemical, non-ionic surfactant and compound of formula (I) will be adjusted accordingly. In concentrated form, compositions of the invention typically contain an agrochemical at from 5 to 45% w/w, more preferably from 10 to 45% w/w, even more preferably from 10 to 25% w/w of the total composition. Ready-to-use compositions of the invention will typically contain an agrochemical at from 0.000001% to 1% w/w, more preferably from 0.000001% to 0.5% w/w, and more preferably still from 0.001% to 0.1% w/w, of the total composition.

The compositions of the present invention may relate to concentrates designed to be added to a farmer's spray tank of water or they may be applied directly without further dilution.

Preferably compositions are selected from an SC (suspension concentrate) and an SL (soluble liquid).

The compositions of the present invention may include one or more other ingredient selected from ingredients such as anti-foam agents, anti-bacterial agents, colourants, perfumes and anti-freeze agents.

Suitable APG commercial products, according to formula (I) are provided in Table A:

TABLE A

| APG | Tail carbon atoms | Mean number of Sugar rings (m) | Griffin HLB |
|---|---|---|---|
| Agnique ® PG8105 | from 8 to 10 | 1.5 | 13.2 |
| Agnique ® PG8107 | from 8 to 10 | 1.7 | 13.6 |

Preferably the APG used in this invention has the chemistry of Agnique® PG8107.

The following early Examples illustrate the problem of successfully formulating a representative non-ionic surfactant (Plurafac® LF221) in water whilst the latter Examples illustrate the present invention, which overcomes that problem.

Plurafac® LF 221 is a butylene oxide/ethylene oxide copolymer of a C13-C15 alcohol.

EXAMPLE 1

Table 1 shows a series of formulations which contain the adjuvant Plurafac® LF 221 in water. The adjuvant was added to water at the concentrations shown and stored at −10° C., 20° C. and 50° C. Samples which were found to be clear isotropic solutions after 24 hours were classified as a pass whereas all other results were classed as a fail. As can be seen from the table it is not possible to use this adjuvant freely in water within this range of temperatures and concentrations.

TABLE 1

| Result | Temperature/ °C. | Plurafac ® LF 221/% w/w | Water/ % w/w |
|---|---|---|---|
| Pass | −10 | 10 | 90 |
| Fail | −10 | 20 | 80 |
| Pass | −10 | 50 | 50 |
| Pass | 20 | 10 | 90 |
| Pass | 20 | 20 | 80 |
| Pass | 20 | 50 | 50 |
| Fail | 50 | 10 | 90 |
| Fail | 50 | 20 | 80 |
| Fail | 50 | 50 | 50 |

EXAMPLE 2

A similar series of experiments was set up as for Example 1 however in this case the water soluble pesticide imazamox was also added to the formulations. These formulations are more complicated than those shown in Table 1 and they reflect the greater difficulty of formulating with a pesticide present. The results of the table are similar to those from Table 1 in that they show that the adjuvant cannot be used freely across a range of temperatures and concentrations.

TABLE 2

| Result | Temperature °C. | Plurafac ® LF 221 % w/w | Water % w/w | Imazamox % w/w |
|---|---|---|---|---|
| Fail | −10 | 10 | 81 | 9 |
| Fail | −10 | 20 | 72 | 8 |
| Fail | −10 | 50 | 45 | 5 |
| Fail | −5 | 10 | 81 | 9 |
| Pass | −5 | 20 | 72 | 8 |
| Pass | −5 | 50 | 45 | 5 |
| Pass | 20 | 10 | 81 | 9 |
| Pass | 20 | 20 | 72 | 8 |
| Pass | 20 | 50 | 45 | 5 |
| Fail | 50 | 10 | 81 | 9 |
| Fail | 50 | 20 | 72 | 8 |
| Fail | 50 | 50 | 45 | 5 |

EXAMPLE 3

Propylene glycol (PG) is sometimes added to surfactant samples in order to break up liquid crystals and to improve the solution behaviour of the samples. These examples show that the addition of propylene glycol is not sufficient to prevent problems with simple mixtures of Plurafac® LF 221 and water.

TABLE 3

| Result | Temperature °C. | Plurafac ® LF 221 % w/w | Water % w/w | PG % w/w |
|---|---|---|---|---|
| Pass | −10 | 10 | 81 | 9 |
| Pass | −10 | 10 | 72 | 18 |
| Pass | −10 | 20 | 72 | 8 |
| Pass | −10 | 20 | 64 | 16 |
| Pass | −10 | 50 | 45 | 5 |
| Pass | −10 | 50 | 40 | 10 |
| Pass | 20 | 10 | 81 | 9 |
| Pass | 20 | 10 | 72 | 18 |
| Pass | 20 | 20 | 72 | 8 |
| Pass | 20 | 20 | 64 | 16 |
| Pass | 20 | 50 | 45 | 5 |
| Pass | 20 | 50 | 40 | 10 |
| Fail | 50 | 10 | 81 | 9 |
| Fail | 50 | 10 | 72 | 18 |
| Fail | 50 | 20 | 72 | 8 |
| Fail | 50 | 20 | 64 | 16 |
| Fail | 50 | 50 | 45 | 5 |
| Fail | 50 | 50 | 40 | 10 |

EXAMPLE 4

Table 4 shows formulations of Plurafac® LF221 in water with added propylene glycol (PG). In this Example the formulations have been complicated further by the addition of imazamox which is a representative pesticide. These formulations are more complicated than those in Example 3 and they display the increasing difficulty of formulating Plurafac® LF 221.

TABLE 4

| Result | Temperature °C. | Plurafac ® LF 221 % w/w | Water % w/w | Imazamox % w/w | PG % w/w |
|---|---|---|---|---|---|
| Pass | −10 | 10 | 72.9 | 8.1 | 9 |
| Pass | −10 | 20 | 64.8 | 7.2 | 8 |
| Pass | −10 | 50 | 40.5 | 4.5 | 5 |
| Pass | −10 | 10 | 64.8 | 7.2 | 18 |
| Pass | −10 | 20 | 57.6 | 6.4 | 16 |
| Pass | −10 | 50 | 36 | 4 | 10 |
| Fail | −10 | 60 | 28.8 | 3.2 | 8 |
| Pass | −5 | 10 | 72.9 | 8.1 | 9 |
| Pass | −5 | 20 | 64.8 | 7.2 | 8 |
| Pass | −5 | 50 | 40.5 | 4.5 | 5 |
| Pass | −5 | 10 | 64.8 | 7.2 | 18 |
| Pass | −5 | 20 | 57.6 | 6.4 | 16 |
| Pass | −5 | 50 | 36 | 4 | 10 |
| Fail | −5 | 60 | 28.8 | 3.2 | 8 |
| Pass | 20 | 10 | 72.9 | 8.1 | 9 |
| Pass | 20 | 20 | 64.8 | 7.2 | 8 |
| Pass | 20 | 50 | 40.5 | 4.5 | 5 |
| Pass | 20 | 10 | 64.8 | 7.2 | 18 |
| Pass | 20 | 20 | 57.6 | 6.4 | 16 |
| Pass | 20 | 50 | 36 | 4 | 10 |
| Pass | 20 | 60 | 28.8 | 3.2 | 8 |
| Fail | 50 | 10 | 72.9 | 8.1 | 9 |
| Fail | 50 | 20 | 64.8 | 7.2 | 8 |
| Fail | 50 | 50 | 40.5 | 4.5 | 5 |
| Fail | 50 | 10 | 64.8 | 7.2 | 18 |
| Fail | 50 | 20 | 57.6 | 6.4 | 16 |
| Pass | 50 | 50 | 36 | 4 | 10 |
| Pass | 50 | 60 | 28.8 | 3.2 | 8 |

EXAMPLE 5

These formulations contain the adjuvant Plurafac® LF221 in water with added amounts of Tween® 20. This surfactant is helpful in preventing compatibility problems at different temperatures although it does not always prevent failure; Table 5 (In combination with the set of data in Table 6) shows that it is not a complete solution to the problem of preventing failure.

TABLE 5

| Result | Temperature ° C. | Plurafac ® LF221 % w/w | Water % w/w | Tween ® 20 % w/w |
|---|---|---|---|---|
| Fail | −10 | 10 | 80 | 10 |
| Pass | −10 | 10 | 60 | 30 |
| Pass | −10 | 20 | 70 | 10 |
| Pass | −10 | 20 | 50 | 30 |
| Pass | −10 | 50 | 40 | 10 |
| Pass | −10 | 50 | 20 | 30 |
| Pass | 20 | 10 | 80 | 10 |
| Pass | 20 | 10 | 60 | 30 |
| Pass | 20 | 20 | 70 | 10 |
| Pass | 20 | 20 | 50 | 30 |
| Pass | 20 | 50 | 40 | 10 |
| Pass | 20 | 50 | 20 | 30 |
| Pass | 50 | 10 | 80 | 10 |
| Pass | 50 | 10 | 60 | 30 |
| Pass | 50 | 20 | 70 | 10 |
| Pass | 50 | 20 | 50 | 30 |
| Pass | 50 | 50 | 40 | 10 |
| Pass | 50 | 50 | 20 | 30 |

EXAMPLE 6

This data set is similar to those shown in Table 5 however imazamox has also been added to the formulations to increase the complexity and to show that the addition of a pesticide makes the problem worse. It can be seen in table 6 that there are a lot of failures.

TABLE 6

| Result | Temperature ° C. | Plurafac ® LF221 % w/w | Water % w/w | Imazamox % w/w | Tween ® 20 % w/w |
|---|---|---|---|---|---|
| Pass | −10 | 0 | 81 | 9 | 10 |
| Pass | −10 | 0 | 72 | 8 | 20 |
| Fail | −10 | 0 | 45 | 5 | 50 |
| Fail | −10 | 10 | 72 | 8 | 10 |
| Pass | −10 | 10 | 63 | 7 | 20 |
| Fail | −10 | 10 | 45 | 5 | 40 |
| Fail | −10 | 10 | 27 | 3 | 60 |
| Fail | −10 | 20 | 63 | 7 | 10 |
| Pass | −10 | 20 | 54 | 6 | 20 |
| Fail | −10 | 20 | 45 | 5 | 30 |
| Fail | −10 | 20 | 27 | 3 | 50 |
| Fail | −10 | 30 | 36 | 4 | 30 |
| Fail | −10 | 40 | 27 | 3 | 30 |
| Fail | −10 | 50 | 36 | 4 | 10 |
| Fail | −10 | 50 | 27 | 3 | 20 |
| Pass | −5 | 0 | 81 | 9 | 10 |
| Pass | −5 | 0 | 72 | 8 | 20 |
| Fail | −5 | 0 | 45 | 5 | 50 |
| Pass | −5 | 10 | 72 | 8 | 10 |
| Pass | −5 | 10 | 63 | 7 | 20 |
| Pass | −5 | 10 | 45 | 5 | 40 |
| Fail | −5 | 10 | 27 | 3 | 60 |
| Pass | −5 | 20 | 63 | 7 | 10 |
| Pass | −5 | 20 | 54 | 6 | 20 |
| Pass | −5 | 20 | 45 | 5 | 30 |
| Fail | −5 | 20 | 27 | 3 | 50 |
| Fail | −5 | 30 | 36 | 4 | 30 |
| Pass | −5 | 40 | 27 | 3 | 30 |
| Pass | −5 | 50 | 36 | 4 | 10 |
| Fail | −5 | 50 | 27 | 3 | 20 |
| Pass | 20 | 0 | 81 | 9 | 10 |
| Pass | 20 | 0 | 72 | 8 | 20 |
| Pass | 20 | 0 | 45 | 5 | 50 |
| Pass | 20 | 10 | 72 | 8 | 10 |
| Pass | 20 | 10 | 63 | 7 | 20 |
| Pass | 20 | 10 | 45 | 5 | 40 |
| Pass | 20 | 10 | 27 | 3 | 60 |
| Pass | 20 | 20 | 63 | 7 | 10 |
| Pass | 20 | 20 | 54 | 6 | 20 |
| Pass | 20 | 20 | 45 | 5 | 30 |
| Pass | 20 | 20 | 27 | 3 | 50 |
| Pass | 20 | 30 | 36 | 4 | 30 |
| Pass | 20 | 40 | 27 | 3 | 30 |
| Pass | 20 | 50 | 36 | 4 | 10 |
| Pass | 20 | 50 | 27 | 3 | 20 |
| Pass | 50 | 0 | 81 | 9 | 10 |
| Pass | 50 | 0 | 72 | 8 | 20 |
| Pass | 50 | 0 | 45 | 5 | 50 |
| Pass | 50 | 10 | 72 | 8 | 10 |
| Pass | 50 | 10 | 63 | 7 | 20 |
| Pass | 50 | 10 | 45 | 5 | 40 |
| Pass | 50 | 10 | 27 | 3 | 60 |
| Pass | 50 | 20 | 63 | 7 | 10 |
| Pass | 50 | 20 | 54 | 6 | 20 |
| Pass | 50 | 20 | 45 | 5 | 30 |
| Pass | 50 | 20 | 27 | 3 | 50 |
| Pass | 50 | 30 | 36 | 4 | 30 |
| Pass | 50 | 40 | 27 | 3 | 30 |
| Fail | 50 | 50 | 36 | 4 | 10 |
| Pass | 50 | 50 | 27 | 3 | 20 |

EXAMPLE 7

This set of formulations contains all the ingredients of the present invention however it displays the fact that the concentration of those ingredients is important. In these examples the amount of Tween® 20 is too high and so there are a large number of failures. These are shown in Table 7.

TABLE 7

| Result | Temperature ° C. | Plurafac ® LF221 % w/w | Water % w/w | Imazamox % w/w | Tween ® 20 % w/w | PG % w/w |
|---|---|---|---|---|---|---|
| Fail | −10 | 0 | 40.5 | 4.5 | 50 | 5 |
| Fail | −10 | 10 | 40.5 | 4.5 | 40 | 5 |
| Fail | −10 | 20 | 40.5 | 4.5 | 30 | 5 |
| Fail | −10 | 30 | 32.4 | 3.6 | 30 | 4 |
| Fail | −10 | 10 | 36 | 4 | 40 | 10 |
| Fail | −10 | 20 | 36 | 4 | 30 | 10 |
| Fail | −5 | 0 | 40.5 | 4.5 | 50 | 5 |
| Pass | −5 | 10 | 40.5 | 4.5 | 40 | 5 |
| Pass | −5 | 20 | 40.5 | 4.5 | 30 | 5 |
| Pass | −5 | 30 | 32.4 | 3.6 | 30 | 4 |
| Pass | −5 | 10 | 36 | 4 | 40 | 10 |
| Pass | −5 | 20 | 36 | 4 | 30 | 10 |
| Pass | 20 | 0 | 40.5 | 4.5 | 50 | 5 |
| Pass | 20 | 10 | 40.5 | 4.5 | 40 | 5 |
| Pass | 20 | 20 | 40.5 | 4.5 | 30 | 5 |
| Pass | 20 | 30 | 32.4 | 3.6 | 30 | 4 |

TABLE 7-continued

| Result | Temperature ° C. | Plurafac ® LF221 % w/w | Water % w/w | Imazamox % w/w | Tween ® 20 % w/w | PG % w/w |
|---|---|---|---|---|---|---|
| Pass | 20 | 10 | 36 | 4 | 40 | 10 |
| Pass | 20 | 20 | 36 | 4 | 30 | 10 |
| Pass | 50 | 0 | 40.5 | 4.5 | 50 | 5 |
| Pass | 50 | 10 | 40.5 | 4.5 | 40 | 5 |
| Pass | 50 | 20 | 40.5 | 4.5 | 30 | 5 |
| Pass | 50 | 30 | 32.4 | 3.6 | 30 | 4 |
| Pass | 50 | 10 | 36 | 4 | 40 | 10 |
| Pass | 50 | 20 | 36 | 4 | 30 | 10 |

EXAMPLE 8

This set of formulations contains all the ingredients of the present invention however it displays the fact that the concentration of those ingredients is important. In these examples the amount of propylene glycol is too low and so there are a large number of failures. These are shown in Table 8.

TABLE 8

| Result | Temperature ° C. | Plurafac ® LF 221 % w/w | Water % w/w | Tween ® 20 % w/w | PG % w/w |
|---|---|---|---|---|---|
| Fail | −10 | 50 | 18 | 30 | 2 |
| Fail | −10 | 50 | 16 | 30 | 4 |
| Fail | 50 | 50 | 18 | 30 | 2 |
| Fail | 50 | 50 | 16 | 30 | 4 |

EXAMPLE 9

This set of formulations contains all the ingredients of the present invention however it displays the fact that the concentration of those ingredients is important. In these examples the amount of propylene glycol is too low and so there are a large number of failures. These formulations also contain imazamox to show the influence of the pesticide. These are shown in Table 9.

TABLE 9

| Result | Temperature ° C. | Plurafac ® LF 221 % w/w | Water % w/w | Imazamox % w/w | Tween ® 20 % w/w | PG % w/w |
|---|---|---|---|---|---|---|
| Fail | −10 | 60 | 24.3 | 2.7 | 10 | 3 |
| Fail | −5 | 60 | 24.3 | 2.7 | 10 | 3 |
| Fail | 20 | 60 | 24.3 | 2.7 | 10 | 3 |
| Fail | 50 | 60 | 24.3 | 2.7 | 10 | 3 |

EXAMPLE 10

In this set of formulations the present invention is clearly demonstrated; the right ingredients are present at the right concentrations to allow the formulation of the adjuvant Plurafac® LF 221 to be successfully formulated across a wide range of both concentration and temperature. The results are seen in Table 10.

TABLE 10

| Result | Temperature ° C. | Plurafac ® LF 221 % w/w | Water % w/w | Tween ® 20 % w/w | PG % w/w |
|---|---|---|---|---|---|
| Pass | −10 | 10 | 72 | 10 | 8 |
| Pass | −10 | 10 | 64 | 10 | 16 |
| Pass | −10 | 10 | 54 | 30 | 6 |
| Pass | −10 | 10 | 48 | 30 | 12 |
| Pass | −10 | 20 | 63 | 10 | 7 |
| Pass | −10 | 20 | 56 | 10 | 14 |
| Pass | −10 | 20 | 45 | 30 | 5 |
| Pass | −10 | 20 | 40 | 30 | 10 |
| Pass | −10 | 50 | 36 | 10 | 4 |
| Pass | −10 | 50 | 32 | 10 | 8 |
| Pass | 20 | 10 | 72 | 10 | 8 |
| Pass | 20 | 10 | 64 | 10 | 16 |
| Pass | 20 | 10 | 54 | 30 | 6 |
| Pass | 20 | 10 | 48 | 30 | 12 |
| Pass | 20 | 20 | 63 | 10 | 7 |
| Pass | 20 | 20 | 56 | 10 | 14 |
| Pass | 20 | 20 | 45 | 30 | 5 |
| Pass | 20 | 20 | 40 | 30 | 10 |
| Pass | 20 | 50 | 36 | 10 | 4 |
| Pass | 20 | 50 | 32 | 10 | 8 |
| Pass | 20 | 50 | 18 | 30 | 2 |
| Pass | 20 | 50 | 16 | 30 | 4 |
| Pass | 50 | 10 | 72 | 10 | 8 |
| Pass | 50 | 10 | 64 | 10 | 16 |
| Pass | 50 | 10 | 54 | 30 | 6 |
| Pass | 50 | 10 | 48 | 30 | 12 |
| Pass | 50 | 20 | 63 | 10 | 7 |
| Pass | 50 | 20 | 56 | 10 | 14 |
| Pass | 50 | 20 | 45 | 30 | 5 |
| Pass | 50 | 20 | 40 | 30 | 10 |
| Pass | 50 | 50 | 36 | 10 | 4 |
| Pass | 50 | 50 | 32 | 10 | 8 |

EXAMPLE 11

In this set of formulations the invention is clearly demonstrated; the right ingredients are present at the right concentrations to allow the formulation of the adjuvant Plurafac® LF 221 to be successfully formulated across a wide range of both concentration and temperature. In these formulations the pesticide imazamox has also been added to demonstrate that the invention works with pesticides. The results are seen in Table 11.

TABLE 11

| Result | Temperature ° C. | Plurafac ® LF221 % w/w | Water % w/w | Imazamox % w/w | Tween ® 20 % w/w | PG % w/w |
|---|---|---|---|---|---|---|
| Pass | −10 | 0 | 72.9 | 8.1 | 10 | 9 |
| Pass | −10 | 0 | 64.8 | 7.2 | 20 | 8 |
| Pass | −10 | 10 | 64.8 | 7.2 | 10 | 8 |
| Pass | −10 | 10 | 56.7 | 6.3 | 20 | 7 |
| Pass | −10 | 20 | 56.7 | 6.3 | 10 | 7 |
| Pass | −10 | 20 | 48.6 | 5.4 | 20 | 6 |
| Pass | −10 | 50 | 32.4 | 3.6 | 10 | 4 |
| Pass | −10 | 10 | 57.6 | 6.4 | 10 | 16 |
| Fail | −10 | 10 | 50.4 | 5.6 | 20 | 14 |
| Pass | −10 | 20 | 50.4 | 5.6 | 10 | 14 |
| Pass | −10 | 20 | 43.2 | 4.8 | 20 | 12 |
| Pass | −10 | 30 | 36 | 4 | 20 | 10 |
| Pass | −10 | 40 | 36 | 4 | 10 | 10 |
| Pass | −5 | 0 | 72.9 | 8.1 | 10 | 9 |
| Pass | −5 | 0 | 64.8 | 7.2 | 20 | 8 |
| Pass | −5 | 10 | 64.8 | 7.2 | 10 | 8 |
| Pass | −5 | 10 | 56.7 | 6.3 | 20 | 7 |
| Pass | −5 | 20 | 56.7 | 6.3 | 10 | 7 |
| Pass | −5 | 20 | 48.6 | 5.4 | 20 | 6 |
| Pass | −5 | 50 | 32.4 | 3.6 | 10 | 4 |
| Pass | −5 | 10 | 57.6 | 6.4 | 10 | 16 |
| Pass | −5 | 10 | 50.4 | 5.6 | 20 | 14 |
| Pass | −5 | 20 | 50.4 | 5.6 | 10 | 14 |
| Pass | −5 | 20 | 43.2 | 4.8 | 20 | 12 |
| Pass | −5 | 30 | 36 | 4 | 20 | 10 |
| Pass | −5 | 40 | 36 | 4 | 10 | 10 |
| Pass | 20 | 0 | 72.9 | 8.1 | 10 | 9 |
| Pass | 20 | 0 | 64.8 | 7.2 | 20 | 8 |
| Pass | 20 | 10 | 64.8 | 7.2 | 10 | 8 |
| Pass | 20 | 10 | 56.7 | 6.3 | 20 | 7 |
| Pass | 20 | 20 | 56.7 | 6.3 | 10 | 7 |
| Pass | 20 | 20 | 48.6 | 5.4 | 20 | 6 |
| Pass | 20 | 50 | 32.4 | 3.6 | 10 | 4 |
| Pass | 20 | 10 | 57.6 | 6.4 | 10 | 16 |
| Pass | 20 | 10 | 50.4 | 5.6 | 20 | 14 |
| Pass | 20 | 20 | 50.4 | 5.6 | 10 | 14 |
| Pass | 20 | 20 | 43.2 | 4.8 | 20 | 12 |
| Pass | 20 | 30 | 36 | 4 | 20 | 10 |
| Pass | 20 | 40 | 36 | 4 | 10 | 10 |
| Pass | 50 | 0 | 72.9 | 8.1 | 10 | 9 |
| Pass | 50 | 0 | 64.8 | 7.2 | 20 | 8 |
| Pass | 50 | 10 | 64.8 | 7.2 | 10 | 8 |
| Pass | 50 | 10 | 56.7 | 6.3 | 20 | 7 |
| Pass | 50 | 20 | 56.7 | 6.3 | 10 | 7 |
| Pass | 50 | 20 | 48.6 | 5.4 | 20 | 6 |
| Pass | 50 | 50 | 32.4 | 3.6 | 10 | 4 |
| Pass | 50 | 10 | 57.6 | 6.4 | 10 | 16 |
| Pass | 50 | 10 | 50.4 | 5.6 | 20 | 14 |
| Pass | 50 | 20 | 50.4 | 5.6 | 10 | 14 |
| Pass | 50 | 20 | 43.2 | 4.8 | 20 | 12 |
| Pass | 50 | 30 | 36 | 4 | 20 | 10 |
| Pass | 50 | 40 | 36 | 4 | 10 | 10 |

EXAMPLE 12

Table 12 provides examples of surfactants that are within the scope of the invention and also some that are not. The measured values of viscosity were made on 50% w/w aqueous solutions of each surfactant. The viscosity against concentration relationship for surfactant solutions is complicated and it should be noted that the maximum viscosity can occur at lower or higher concentrations than 50% w/w. The literature values for cloud point were measured using BS EN1890:2006, method E as explained elsewhere in this document.

TABLE 12

| Surfactant | Brookfield mPas (literature) | 50% aqueous solution (measured) | Cloud Point ° C. (literature) |
|---|---|---|---|
| Plurafac 132 LF ® | 25 | | 38 |
| Lutensol XL 40 ® | 40 | | 46 |
| Plurafac 120 LF ® | 40 | Low viscosity | 48 |
| Plurafac 131 LF ® | 40 | | 42 |
| Lutensol TO3 ® | 50 | | 40 |
| Plurafac 231 LF ® | 50 | Low viscosity | 35 |
| Plurafac 224 LF ® | 55 | | 35 |
| Plurafac 403 LF ® | 60 | | 51 |
| Plurafac 500 LF ® | 65 | | 38 |
| Lutensol XP 69 ® | 70 | | 62 |
| Lutensol XL 70 ® | 70 | | 68 |

TABLE 12-continued

| Surfactant | Brookfield mPas (literature) | 50% aqueous solution (measured) | Cloud Point ° C. (literature) |
|---|---|---|---|
| Plurafac 223 LF ® | 70 | | 41 |
| Plurafac 305 LF ® | 70 | Low viscosity | 44 |
| Lutensol TO5 ® | 80 | | 62 |
| Lutensol TO565 ® | 80 | | 66 |
| Lutensol TO6 ® | 80 | | 67 |
| Lutensol XL 60 ® | 80 | | 69 |
| Plurafac 711 LF ® | 80 | | 49 |
| Plurafac 900 LF ® | 85 | | 46 |
| Lutensol XP 40 ® | 90 | | 44 |
| Lutensol XP 50 ® | 90 | | 56 |
| Lutensol XP 79 ® | 90 | | 68 |
| Lutensol XP 89 ® | 90 | | 74 |
| Lutensol TO389 ® | 100 | | 70 |
| Lutensol TO65 ® | 100 | | 68 |
| Lutensol TO7 ® | 100 | | 70 |
| Lutensol XP 99 ® | 100 | | 76 |
| Lutensol TO89 ® | 120 | | 80 |
| Lutensol XL 79 ® | 120 | | 68 |
| Lutensol XL 80 ® | 120 | | 74 |
| Plurafac 226 LF ® | 120 | | 46 |
| Lutensol XP 60 ® | 130 | | 62 |
| Plurafac 431 LF ® | 130 | Low viscosity | 46 |
| Plurafac 901 LF ® | 130 | | 53 |
| Lutensol TO109 ® | 150 | | 82 |
| Lutensol TO8 ® | 150 | | 80 |
| Lutensol XP 80 ® | 150 | Low viscosity | 74 |
| Lutensol XL 89 ® | 150 | | 74 |
| Plurafac 220 LF ® | 150 | | 52 |
| Plurafac 301 LF ® | 150 | | 41 |
| Lutensol XL 99 ® | 160 | | 77 |
| Plurafac 221 LF ® | 190 | Low viscosity | 48 |
| Plurafac 400 LF ® | 230 | Low viscosity | 54 |
| Lutensol XP 70 ® | 350 | Low viscosity | 68 |
| Plurafac 1530 LF ® | 350 | | 56 |
| Plurafac 303 LF ® | 350 | | 35 |
| Lutensol XL 90 ® | 400 | | 77 |
| Plurafac 7319 LF ® | 400 | | 53 |
| Plurafac 1430 LF ® | 450 | | 40 |
| Plurafac 401 LF ® | 570 | Gel | 70 |
| Lutensol TO10 ® | 1000 | | 82 |
| Lutensol XP 90 ® | 1200 | | 76 |
| Lutensol TO12 ® | 2000 | | 88 |
| Plurafac 404 LF ® | 2400 | High viscosity | 52 |
| Lutensol XP 100 ® | 3100 | | 81 |
| Plurafac 300 LF ® | 4800 | Gel | 53 |
| Lutensol TO15 ® | 10000 | | 89 |
| Plurafac 405 LF ® | 47000 | High viscosity | 60 |
| LutensolAT 11 ® | 100000 | | |
| LutensolAT 13 ® | 100000 | | |
| LutensolAT 18 ® | 100000 | | |
| LutensolAT 25 ® | 100000 | | |
| Lutensol XL 100 ® | 100000 | | |
| Lutensol XL 140 ® | 100000 | | |

Key:
Low viscosity-sample pours freely at 20° C.
High viscosity-sample does not flow freely at 20° C.
Gel-sample is not free-flowing at 20° C. nor at 23° C.

EXAMPLE 13

The present invention is illustrated by a wide array of agrochemicals. Table 13 shows examples of stable built-in adjuvant formulations for a wide array of insecticides, fungicides and herbicides. Concentrations are by weight (i.e. % w/w). Each formulation was found to be free flowing at room temperature and to readily dilute into tap water; the dilutions formed fine droplet emulsions and fine particle suspensions of particles.

TABLE 13

| Agrochemical | Amount | Plurafac LF404 | Tween 20 | Propylene glycol | Water |
|---|---|---|---|---|---|
| Mandipropamid | 4.0% | 29.6% | 20.1% | 10.1% | 36.2% |
| Prometryn | 3.7% | 29.4% | 20.3% | 10.1% | 36.5% |
| Isopyrazam | 3.9% | 30.3% | 20.0% | 10.0% | 35.9% |
| Difenoconazole | 4.9% | 29.9% | 19.8% | 9.9% | 35.6% |
| Lufenuron | 4.8% | 30.4% | 19.6% | 9.8% | 35.3% |
| Thiamethoxam | 4.8% | 30.5% | 19.6% | 9.8% | 35.3% |
| Mesosulfuron | 4.0% | 29.8% | 20.1% | 10.0% | 36.1% |
| Pyribenzoxim | 4.3% | 27.6% | 20.7% | 10.3% | 37.2% |
| Cloquintocet mexyl | 4.9% | 24.9% | 21.3% | 10.6% | 38.3% |
| Napropamide | 4.7% | 29.0% | 20.1% | 10.0% | 36.2% |
| Fludioxynil | 4.4% | 18.1% | 23.5% | 11.7% | 42.3% |
| Pinoxaden | 4.3% | 23.9% | 21.8% | 10.9% | 39.2% |
| Epoxyconazole | 3.9% | 15.6% | 24.4% | 12.2% | 43.9% |
| Terbuthylazine | 4.8% | 32.5% | 19.0% | 9.5% | 34.2% |
| Cyproconazole | 3.8% | 37.4% | 17.8% | 8.9% | 32.1% |
| Cyflufenamid | 5.7% | 34.6% | 18.1% | 9.0% | 32.5% |
| Solatenol | 5.4% | 34.0% | 18.4% | 9.2% | 33.1% |
| Oxyfluorfen | 5.0% | 29.6% | 19.8% | 9.9% | 35.7% |
| Atrazine | 4.1% | 32.1% | 19.3% | 9.7% | 34.8% |
| Cyprodinil | 4.9% | 24.9% | 21.3% | 10.6% | 38.3% |

EXAMPLE 14

The present invention is illustrated by an array of surfactants. Table 14 shows stable built-in adjuvant formulations prepared with imazamox. Concentrations are by weight (% w/w). Each formulation was found to be free flowing at room temperature and to have a homogeneous single phase liquid.

TABLE 14

| Surfactant | Amount | Imazamox | Tween 20 | Propylene glycol | Water |
|---|---|---|---|---|---|
| Lutensol TO3 ® | 48.1% | 4.80% | 9.62% | 9.62% | 27.86% |
| Plurafac 221 LF ® | 48.1% | 4.80% | 9.62% | 9.62% | 27.86% |
| Plurafac 305 LF ® | 48.1% | 4.80% | 9.62% | 9.62% | 27.86% |
| Plurafac 403 LF ® | 48.1% | 4.80% | 9.62% | 9.62% | 27.86% |
| Plurafac 404 LF ® | 48.1% | 4.80% | 9.62% | 9.62% | 27.86% |

The invention claimed is:
1. A formulation, comprising:
(i) imazamox at a concentration of 1 to 20% w/w;
(ii) a non-ionic surfactant with a cloud point of from 35° C. to 55° C. and which is not component (iii) or (iv) at a concentration of from 10 to 60% w/w;
(iii) an ethoxylated or propoxylated sorbitan ester at a concentration from 8 to 20% w/w;
(iv) propylene glycol at a concentration from 8 to 20% w/w; and
(v) water at a concentration of at least 1% w/w;
wherein the formulation is a soluble liquid; and
wherein the formulation remains clear and isotropic after 24 hours at any temperature between −10° C. and 50° C.

2. The formulation of claim 1, wherein the non-ionic surfactant has a viscosity in water at 23° C., at a concentration of from 10 to 90% w/w, of less than 5000 mPas, and wherein (iii) is a polysorbate-type nonionic surfactant formed by the ethoxylation of sorbitan before the addition of lauric acid.

3. The formulation of claim 1, wherein
the ratio of (iv) to (i) is greater than 1:1;
the ratio of (ii) to (iv) is 0.625 to 5:1; and
the ratio of (iii) to (iv) is 0.625 to 2:1.

4. The formulation of claim 1, wherein the non-ionic surfactant has a cloud point from 40° C. to 50° C.

5. The formulation of claim 1, wherein (iii) is a polysorbate-type nonionic surfactant formed by the ethoxylation of sorbitan before the addition of lauric, palmitic, stearic or oleic acid.

6. The formulation of claim 1, wherein (iii) is a polysorbate-type nonionic surfactant formed by the ethoxylation of sorbitan before the addition of lauric acid.

7. The formulation of claim 1, wherein
the ratio of (ii) to (iv) is 0.625 to 5:1; and
the ratio of (iii) to (iv) is 0.625 to 2:1.

* * * * *